(12) United States Patent
Cebry

(10) Patent No.: US 7,321,498 B2
(45) Date of Patent: Jan. 22, 2008

(54) DC-DC CONVERTER HAVING SYNCHRONOUS RECTIFICATION WITHOUT CROSS CONDUCTION

(75) Inventor: George L. Cebry, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 166 days.

(21) Appl. No.: 11/264,067

(22) Filed: Oct. 31, 2005

(65) Prior Publication Data

US 2007/0097714 A1 May 3, 2007

(51) Int. Cl.
*H02M 3/335* (2006.01)
(52) U.S. Cl. .................. 363/21.02; 363/21.04
(58) Field of Classification Search ............ 363/16–20, 363/97, 131, 95, 89, 127, 71, 53, 65–68, 363/81, 21.2, 21.4
See application file for complete search history.

(56) References Cited

U.S. PATENT DOCUMENTS 5,724,235 A * 3/1998 Shimamori et al. ...... 363/21.06
6,351,396 B1 * 2/2002 Jacobs ..................... 363/21.06

* cited by examiner

*Primary Examiner*—Rajnikant B. Patel
(74) *Attorney, Agent, or Firm*—Ingrassia Fisher & Lorenz

(57) ABSTRACT

An apparatus (54) is provided for preventing cross conduction in a synchronous rectifier of a DC-DC converter (10). The DC-DC converter has an input MOSFET switch (26) coupled to primary windings (22) of an isolation transformer (20), an output MOSFET switch (30) coupled to secondary windings (24) of the isolation transformer, and a complementary output MOSFET switch (34) coupled to an output terminal (14). A synchronous rectifier timing circuit (54) comprises a first timing output signal circuit (62) responsive to a pulse width modulated signal for providing first and second timing output signals (55, 56) that switches low at time t1 and high at time t4 to control the input MOSFET switch and output MOSFET switch, respectively, and a second timing output signal circuit (64) responsive to the pulse width modulated signal for providing a third timing output signal (58) that switches high at time t2 and low at time t3 to control the complementary output MOSFET switch.

16 Claims, 3 Drawing Sheets

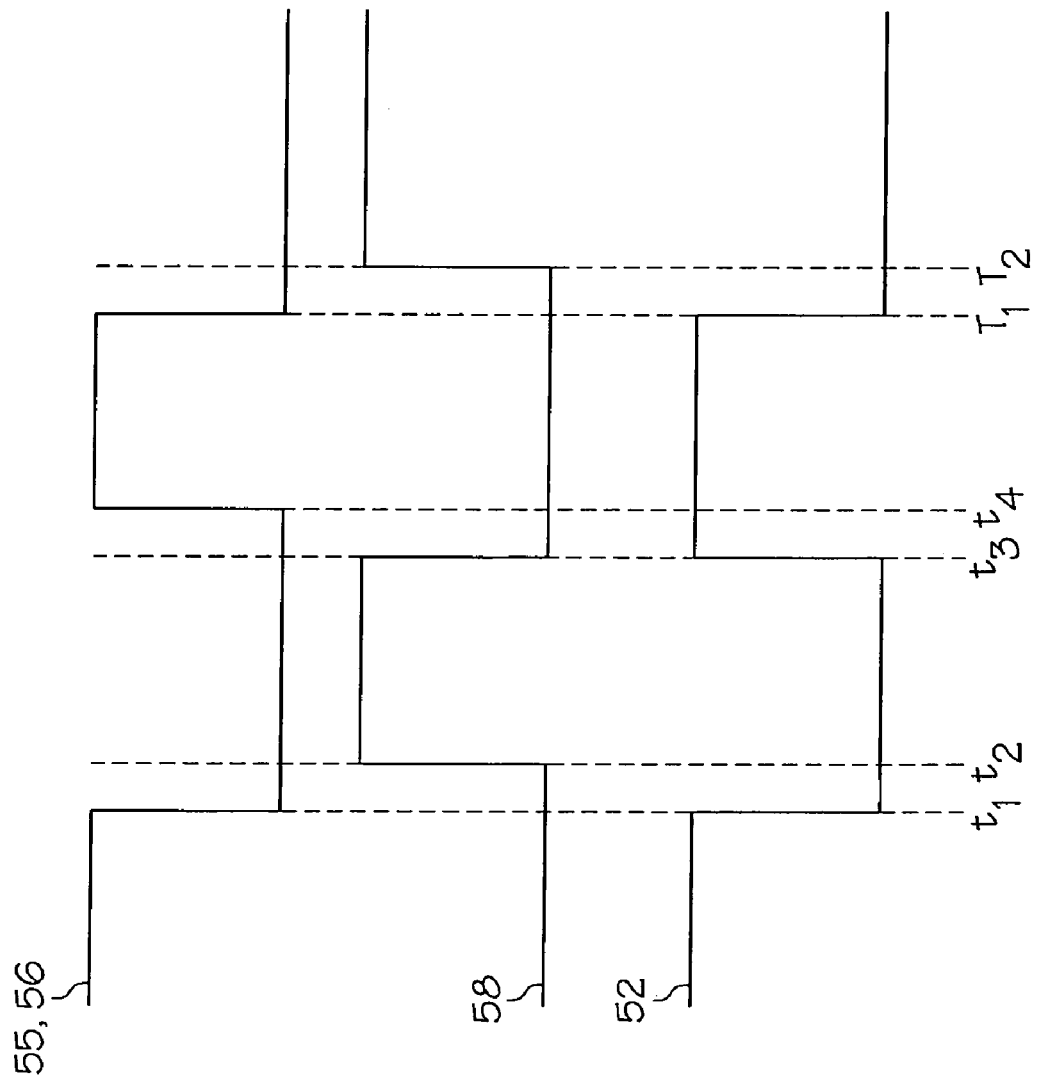

DC-DC CONVERTER HAVING SYNCHRONOUS RECTIFICATION WITHOUT CROSS CONDUCTION

This invention was made with Government support under Contract No. LES76BT476 awarded by Raytheon. The Government has certain rights in the invention.

FIELD OF THE INVENTION

The present invention generally relates to synchronous rectifiers and more particularly to a DC-DC converter having synchronous rectification without cross conduction.

BACKGROUND OF THE INVENTION

Synchronous rectifiers improve the efficiency of all DC-DC converters by reducing the power dissipated in the output rectification stage. Power dissipation is decreased by reducing the output voltage drop in the rectification stage. By replacing diodes with devices having lower voltage drops, efficiency will be dramatically increased, particularly at low output voltage levels in the range of 1.5 to 3.3 volts. This is the Synchronous Rectification concept, using MOSFETS instead of diodes as rectifiers.

Control of synchronous rectifiers in DC-DC converters conventionally have been accomplished by self-driven and control driven circuitry. Each method does not prevent current spikes, or cross-conduction, as the current switches from one MOSFET to the other. In self-driven circuitry, the diodes are replaced by MOSFET switches having their gates connected to the secondary winding of the isolation transformer. Although this method is simple and has low MOSFET driving losses, the driving voltage and timing are highly dependent on the converter topology and limits the useable input voltage range since the gate drive voltage varies with input voltage.

Control-driven techniques, though more complex than self-driven methods, can overcome the limitations thereof except for preventing cross conduction. Control-driven techniques offer constant gate drive voltage but have driving losses and additional cost because of added parts. This method allows use of several power topologies without input voltage limitations.

Accordingly, it is desirable to provide an apparatus for preventing cross conduction in a synchronous rectifier. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for preventing cross conduction in a synchronous rectifier of a DC-DC converter. The DC-DC converter has an input MOSFET switch coupled to primary windings of an isolation transformer, an output MOSFET switch coupled to secondary windings of the isolation transformer, and a complementary output MOSFET switch coupled to an output terminal. The synchronous rectifier timing circuit comprises a first timing output signal circuit responsive to the pulse width modulated signal for providing first and second timing output signals that switches low at time t1 and high at time t4 to control the input MOSFET switch and output MOSFET switch, and a second timing output signal circuit responsive to the pulse width modulated signal for providing a third timing output signal that switches high at time t2 and low at time t3 to control the complementary output MOSFET switch.

BRIEF DESCRIPTION OF THE DRAWINGS

The present invention will hereinafter be described in conjunction with the following drawing figures, wherein like numerals denote like elements.

FIG. 3 is a timing diagram of the exemplary embodiment of FIG. 2.

DETAILED DESCRIPTION OF THE INVENTION

The following detailed description of the invention is merely exemplary in nature and is not intended to limit the invention or the application and uses of the invention. The invention is shown using a DC-DC Forward Converter Topology but can be applied to all converter topologies. Furthermore, there is no intention to be bound by any theory presented in the preceding background of the invention or the following detailed description of the invention.

A timing control circuit is disclosed that staggers signals from a pulse wave modulated signal preventing cross conduction in a synchronous rectifier of a DC-DC converter. The DC-DC converter comprises a power processing stage with three MOSFET switches (input, output, complementary output), an isolation transformer, an output inductor, and input and output capacitors. An input voltage is provided across the first winding of the isolation transformer. The output inductor is connected in series to the load and provides a continuous output current. The input switch is coupled on the transformer's primary side while the output and complementary output switches are coupled on the transformer's secondary side.

The output and complementary MOSFET switches operate with a switching sequence and time control which prevents cross conduction. By delaying the drive voltages of the output and complementary output MOSFET switches, cross conduction is prevented and no large current spike occurs.

Figure 1:
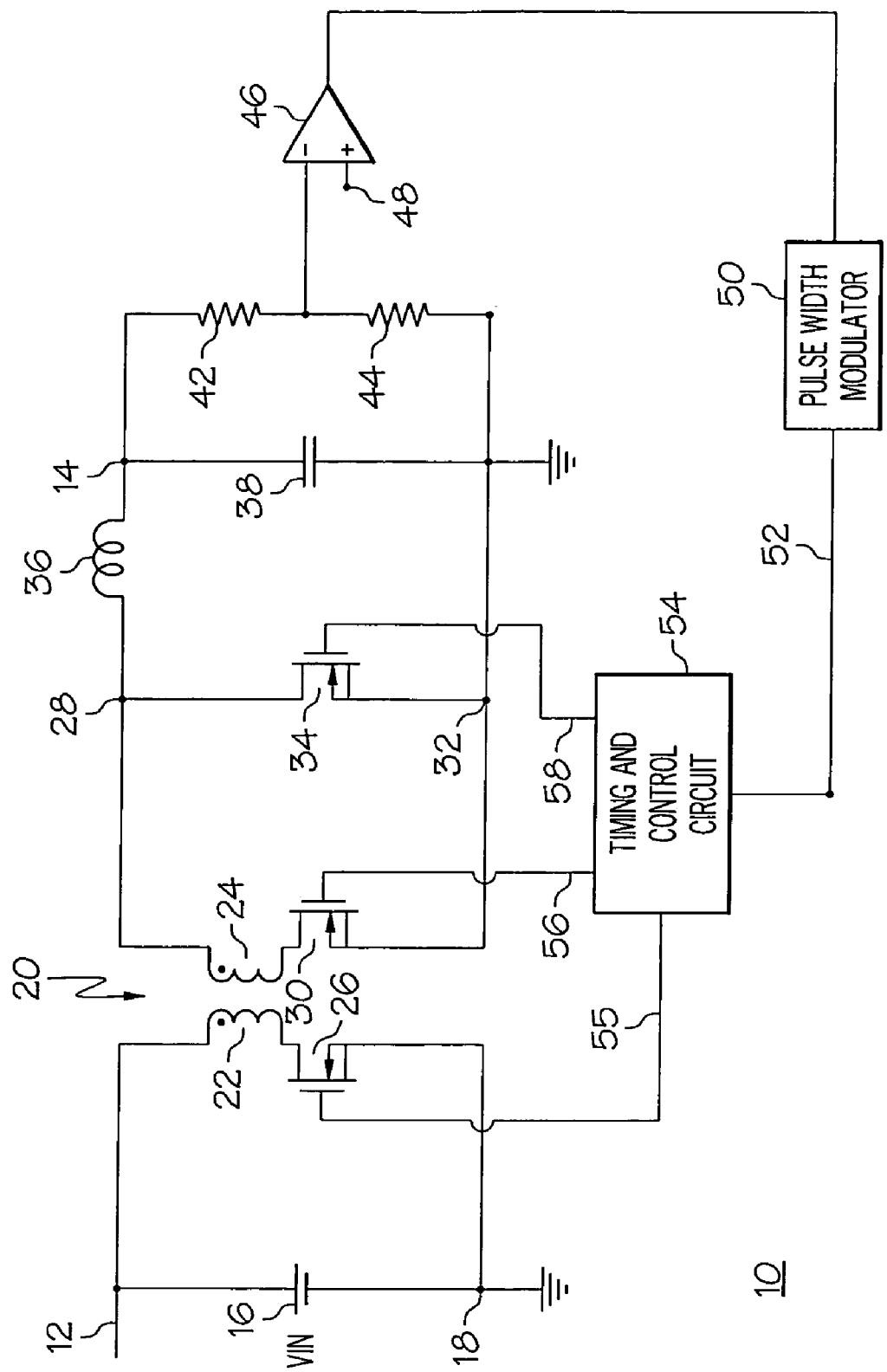
FIG. 1 is a partial schematic of a DC-DC converter in accordance with an exemplary embodiment.

A DC-DC converter 10 of FIG. 1 includes a first terminal 12 and a second terminal 14. A DC voltage is applied to the first terminal 12 and a converted DC voltage is provided at the second terminal 14. A DC voltage 16 is coupled between the first terminal 12 and a first voltage reference (first ground) terminal 18. An isolation transformer 20 has a first winding 22 coupled between the first terminal 12 and the drain of an input MOSFET switch 26, and a second winding 24 coupled between the node 28 and the drain of an output MOSFET switch 30. The source of the MOSFET switch 26 is connected to the first voltage reference terminal 18, and the source of MOSFET switch 30 is connected to a second voltage reference (second ground) terminal 32. A complementary output MOSFET switch 34 has its drain connected to the node 28 and its source connected to second voltage reference terminal 32. An output inductor 36 is coupled between the node 28 and the second terminal 14, and an output capacitor 38 is coupled between the second terminal 14 and the second voltage reference terminal 32. Resistors 42 and 44 are coupled in series between the second terminal 14 and the second voltage reference terminal 32. An error amplifier 46 has a negative input connected between the resistors 42 and 44, a positive input coupled to a third voltage reference terminal 48, and an output connected to the pulse width modulator 50.

The pulse width modulator 50 provides a pulse width modulated (PWM) signal 52 to the timing and control circuit 54. The timing and control circuit 54 provides first, second, and third output signals 55, 56, and 58 to the gates of MOSFET switches 26, 30, and 34, respectively.

MOSEFET switch 26 is turned on and off resulting in a rectangular voltage waveform whose amplitude is the input voltage 16 and it's duty cycle is the control variable across transformer primary windings 22. The transformer 20 provides either step-up or step-down function via appropriate turns ratio.

The voltage waveform of the secondary winding 24 is similar to the voltage waveform of the primary winding 22 and goes positive when MOSFET switch 26 turns on because MOSFET switch 30 turns on at the same time. This presents a unipolar PWM rectangular voltage waveform to inductor 36. Inductor 36 and capacitor 38 filter the rectangular waveform into an average DC voltage. MOSFET switch 34 turns on after MOSFET switches 26 and 30 turn off to maintain constant current in inductor 36.

Error amplifier 46 compares the average voltage at node 14 to a reference voltage at node 48 and provides an error voltage to the Pulse Width Modulator (PWM) 50. The PWM varies the duty cycle based on the error voltage amplitude and provides a PWM signal 52 to the Timing and Control Circuit 54.

The Timing and Control Circuit drives MOSFET switches 26, 30 and 34 on and off and insures the MOSFET switches 30 and 34 do not turn on at the same time, thus eliminating cross conduction. MOSFET switch 30 is turned on at the same time as MOSFET switch 26 and MOSFET switch 34 is turned off when MOSFET switch 26 is turned on. Thus, MOSFET switch 34 is the complement of MOSFET switch 26. When MOSFET switches 30 and 34 are off, current circulates in the body diode of the MOSFET switches 30 and 34 to maintain current flow in inductor 36. Additional low voltage drop diodes (not shown) can be placed across MOSFET 30 and 34 drain to source to improve efficiency.

Figure 2:
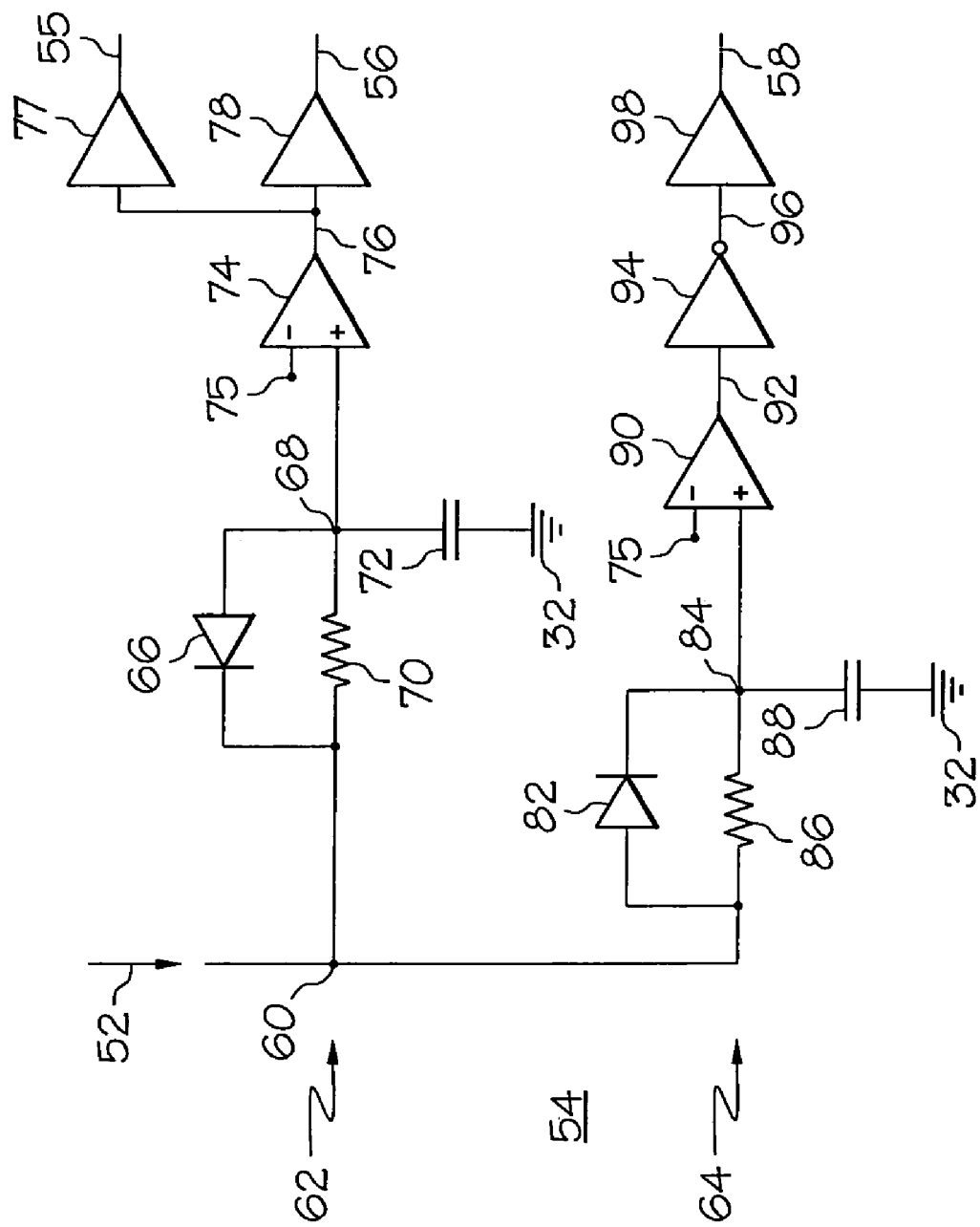
FIG. 2 is a schematic of an exemplary embodiment.

Referring to FIG. 2 and in accordance with an exemplary embodiment of the present invention, the timing control circuit 54 receives the PWM signal 52 at a node 60 for supplying the PWM signal 52 to two output signal circuits 62 and 64 which provide the output signals 55, 56, and 58. The two output signal circuits 62 and 64 may be isolated from the PWM signal 52 with a transformer, opto-coupler, or other isolation device (not shown). Furthermore, a separate PWM signal (not shown) for each output signal circuit 62 and 64 may be provided in lieu of the PWM signal 52. Also for some topologies like the CUK and Flyback converters that only have one output diode, the timing and control output signal 56 would not be used to drive the output MOSFET 30

The output signal circuit 62 comprises a diode 66 having a cathode connected to node 60 and an anode connected to node 68, and a resistor 70 coupled between nodes 60 and 68. A capacitor 72 is coupled between node 68 and second voltage reference terminal 32. Comparator 74 has it's positive input connected to node 68, it's negative input connected to the third voltage reference on node 75, and an output 76 connected to the input of a MOSFET drivers 77 and 78, whose output provides output signals 55 and 56, respectively.

In operation, output signal circuit 62 receives the PWM signal 52 at node 60. When the PWM signal 52 goes high, the signal goes through resistor 70 and capacitor 72, providing a time delay in the rise time. When the PWM signal 52 goes low, the signal goes through diode 66, bypassing resistor 70 and no time delay occurs on the fall time. Comparator 74 is set to not provide an output signal 76 until a specified voltage level is reached as defined by the third voltage reference on node 75. Comparator output signal 76 goes to input of MOSFET drivers 77 and 78. The MOSFET driver 77 provides the required voltage and current to drive MOSFET switch 26 at output signal 55. The MOSFET driver 78 provides the required voltage and current to drive MOSFET switch 30 at output signal 56.

The output signal circuit 64 comprises a diode 82 having an anode connected to node 60 and a cathode connected to node 84, and a resistor 86 coupled between nodes 60 and 84. A capacitor 88 is coupled between node 84 and the second voltage reference terminal 32. A comparator 90 has it's positive input connected to node 84, it's negative input connected the third voltage reference on node 75, and an output 92 connected to the input of an inverter 94. The output 96 of the inverter 94 is connected to an input of a MOSFET driver 98, whose output provides output signal 58.

In operation, output signal circuit 64 receives the PWM signal 52 at node 60. When the PWM signal 52 goes high, the signal goes through diode 82, bypassing resistor 86 and no time delay occurs on the rise time. When the PWM signal 52 is low, the resistor 86 and capacitor 88 provides a time delay on the fall time. Comparator 90 is set to not provide output signal 92 until a specified voltage level is reached as defined by the voltage reference on node 75. Inverter 94 inverts the output 92. Inverter output signal 96 goes to input of MOSFET driver 98. The MOSFET driver 98 provides the required voltage and current to drive MOSFET switch 34 at output signal 58.

Referring to FIG. 3, the timed sequence is shown for PWM signal 52 and pulsed output signals 55, 56, and 58. It is the sequence of these output signals 55, 56, and 58 switching MOSFET switches 26, 30, and 34, respectively, that leads to the desired result of preventing cross conduction in the synchronous rectifier 10. In the exemplary embodiment, the capacitors 72 and 88 have a capacitance of 100 picofarads. Resistors 70 and 86 each have a resistance of 1000 ohms. Reference voltage 75 has a value of 2.5V. These values, while important in a relationship sense, may be different values in other embodiments as long as the timing of the switching of the output signals 56 and 58 remain as disclosed herein.

When the PWM signal 52 goes low at time t1, the output signals 55 and 56 will go low without delay as any charge on capacitor 72 is discharged relatively quickly through diode 66.

At time t2, the output signal 58 will go high. The output signal 58 is inverted by inverter 94 and delayed from the PWM signal 52 by the RC time constant provided by resistor 86 and capacitor 88 (diode 82 blocks the current).

At time t3, the PWM signal 52 goes high, and the output signal 58 will go low without delay with the current going through diode 82, bypassing resistor 86 and being inverted by inverter 94.

At time t4, the output signals 55 and 56 will go high, delayed from the PWM signal 52 by the RC time constant provided by resistor 70 and capacitor 72.

Thus, three pulsed signals are provided having their rise and fall times sequenced to operate the input MOSFET switch 26, the output MOSFET switch 30 and complementary output MOSFET switch 34 of the synchronous rectifier 10 in a manner to prevent cross conduction by preventing a current spike caused by both MOSFET switches 30 and 34 being on at the same time. Minor changes in the timing of rise and fall times of the output signals 55, 56, and 58 relative to the PWM signal 52 may be made in order to obtain the most efficient timed sequence. An example of a minor change would be to adjust the timing delay to have an output signal 58 to switch high at any time between t1 and t2.

Variations to the embodiment include but are not limited to the following: 1) For better noise immunity, hysteresis can be placed around each of the comparators 74 and 90. 2) One or more of the comparators 74 and 90 can be replaced with a logic non-inverter gate or equivalent. Different logic families would control the RC time delayed base on the logic family high and low switching thresholds. When the term "comparator" is used herein, it is understood that it may comprise include logic families. 3) The circuit can be produced using all plated through hole parts, all surface mount parts, or a combination of both may be used. 4) The embodiment can be created with a custom IC, custom hybrid, custom gate array, or other custom implementation. 5) The embodiment can be used with or without MOSFET drivers 77, 78, and 98. 6) The input and/or output of the MOSFET drivers 77, 78, and 98 may be isolated individually or together from the output signal circuits 60 and 64, with a transformer, opto-coupler, or other isolation device (not shown). 7) Each MOSFET driver 77, 78, and 98 can drive one or more MOSFETS.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A timing circuit for a synchronous rectifier having an input MOSFET switch coupled to primary windings of an isolation transformer, an output MOSFET switch coupled to secondary windings of the isolation transformer, and a complementary output MOSFET switch coupled to an output terminal, the timing circuit comprising:
   a first timing output signal circuit responsive to a pulse width modulated signal at a first input terminal and providing first and second timing output signals that switch low at time t1 and high at time t4 to control the input MOSFET switch and output MOSFET switch, respectively, wherein the first timing output signal circuit comprises:
      a first resistor coupled between the input terminal and a first node;
      a first diode having a cathode connected to the input terminal and an anode connected to the first node;
      a first capacitor coupled between the first node and a first voltage reference; and
      a first comparator having a positive input connected to the first node, a negative input connected to a second voltage reference, and an output providing the first and second timing output signals; and
   a second timing output signal circuit responsive to the pulse width modulated signal and providing a third timing output signal that switches high at time t2 and low at time t3 to control the complementary output MOSFET switch.

2. The timing circuit of claim 1 wherein the times t1 through t4 occur in sequence.

3. The timing circuit of claim 1 wherein the pulse width modulated signal is taken from an output of the synchronous rectifier.

4. The timing circuit of claim 1 wherein the second timing output signal circuit comprises:
   a second resistor coupled between the input terminal and a second node;
   a second diode having an anode connected to the input terminal and a cathode connected to the second node;
   a second capacitor coupled between the second node and the first voltage reference; and
   a second comparator having a positive input connected to the second node and a negative input connected to the second voltage reference; and
   a first inverter having an inverting input connected to an output of the second comparator, and an output providing the third timing output signal.

5. The timing circuit of claim 4 further comprising a first MOSFET driver coupled to the output of the first comparator for providing the first timing output signal.

6. The timing circuit of claim 5 further comprising a second MOSFET driver coupled to the output of the first comparator for providing the second timing output signal.

7. The timing circuit of claim 6 further comprising a third MOSFET driver coupled to the output of the first inverter for providing the first timing output signal.

8. The timing circuit of claim 4 wherein the times t1 through t4 occur in sequence.

9. A DC-DC converter without cross conduction comprising:
   a DC-DC Converter input terminal;
   a DC-DC Converter output terminal;
   an input DC voltage coupled between the DC-DC converter input terminal and a first voltage reference terminal
   an isolation transformer having a first side of first windings coupled to the DC-DC converter input terminal and a first side of second windings coupled to an output node;
   an input MOSFET switch coupled between a second side of the first windings and the first voltage reference terminal;
   an output MOSFET switch coupled between a second side of the second windings and a second voltage reference terminal;
   a complementary output MOSFET switch coupled between the output node and the second voltage reference terminal;
   an output capacitor coupled between the synchronous rectifier output terminal and the second voltage reference terminal;
   an error amplifier having a negative input coupled to the synchronous rectifier output terminal and a positive input coupled to a third voltage reference terminal;
   a pulse width modulator having an input coupled to an output of the error amplifier and providing a pulse width modulated signal that switches low at time t1 and high at time t3; and
   a synchronous rectifier timing circuit comprising:

a first output signal circuit responsive to the pulse width modulated signal and providing first and second timing output signals that switch low at time t1 and high at time t4 to control the input MOSFET switch and output MOSFET switch, respectively, wherein the first output signal circuit comprises:

a first resistor coupled between the output of the pulse width modulator and a first node;

a first diode having a cathode connected to the output of the pulse width modulator and an anode connected to the first node;

a first capacitor coupled between the first node and a first voltage reference; and a first comparator having a positive input connected to the first node, having a negative input connected to a second voltage reference, and an output providing the first and second timing output signals; and a second output signal circuit responsive to the pulse width modulated signal and providing a third timing output signal that switches high at time t2 and low at time t3 to control the complementary output MOSFET switch.

10. The DC-DC converter of claim 9 wherein the times t1 through t4 occur in sequence.

11. The DC-DC converter of claim 9 wherein the second output signal circuit comprises:

a second resistor coupled between the input terminal and a second node;

a second diode having an anode connected to the input terminal and a cathode connected to the second node;

a second capacitor coupled between the second node and the first voltage reference; and a second comparator having a positive input connected to the second node and a negative input connected to the second voltage reference; and a first inverter having an inverting input connected to an output of the second comparator, and an output providing the third timing output signal.

12. The DC-DC converter of claim 11 further comprising a first MOSFET driver coupled to the output of the first comparator for providing the first timing output signal.

13. The DC-DC converter of claim 12 further comprising a second MOSFET driver coupled to the output of the first comparator for providing the second timing output signal.

14. The DC-DC converter of claim 13 further comprising a third MOSFET driver coupled to the output of the first inverter for providing the third timing output signal.

15. The DC-DC converter of claim 11 wherein the times t1 through t4 occur in sequence.

16. A method of generating timing control signals for a DC-DC converter having a first input MOSFET switch coupled to primary windings of an isolation transformer and first and second output MOSFET switches coupled to secondary windings of the isolation transformer, comprising:

when a pulse modulated signal goes low at time t1 and bypasses a first resistor-capacitor delay circuit, thereby:

causing a first input signal to go low at time t1 for switching the first input MOSFET switch; and causing a first output signal to go low at time t1 for switching the first output MOSFET switch;

when a pulse modulated signal goes low at time t1 and is delayed by a second resistor-capacitor delay circuit, thereby:

causing a second output signal to go high at time t2 for switching the second output MOSFET switch; and when the pulse modulated signal goes high at time t3 and is delayed by the first resistor-capacitor delay circuit, thereby:

causing the first input signal to go high at time t4 for switching the first input MOSFET switch; and causing the first output signal to go high at time t4 for switching the first output MOSFET switch; and when the pulse modulated signal goes high at time t3 and bypasses the second resistor-capacitor delay circuit, thereby:

causing the second output signal to go low at time t3 for switching the second output MOSFET switch.

* * * * *